United States Patent Office 3,148,099
Patented Sept. 8, 1964

3,148,099
METHOD OF MAKING ALUMINUM
FOIL NAMEPLATE
Gerald N. Markoff, Teaneck, N.J., assignor to Graphtex, Inc., Yonkers, N.Y., a corporation of New York
No Drawing. Filed July 3, 1961, Ser. No. 121,316
6 Claims. (Cl. 156—13)

The present invention relates to ornamentation, and, more particularly, to the fabrication of improved aluminum foil nameplates and the like adapted to be adhesively secured to an object.

A presently widely used process of fabricating nameplates from a sheet of aluminum foil having an anodized colored surface on at least one side thereof generally comprises etching the colored surface to produce indicia thereon, and applying an adhesive-paper laminate to the surface of the opposite side of the sheet. Generally, indicia for a plurality of nameplates is produced on the sheet, and the sheet is then cut up to provide a plurality of individual nameplates.

The nameplates are applied to objects by first removing the paper from the nameplates which exposes the adhesive coating on the underside of the nameplates, and then placing the nameplates on the objects at the desired location and applying pressure and/or heat or activating solvent to adhere the nameplates to the objects.

Since such aluminum foil sheets have a thickness of between about .002 and 0.005 inch, difficulty is found in handling the sheets both in anodizing, enameling or otherwise coloring the same, and in the etching thereof unless the aluminum foil sheets are tempered, preferably at least half hard.

The foregoing types of nameplates are highly acceptable in industry for many uses, but such nameplates have a serious disadvantage when applied to curved or irregular surfaces. Even when using the most tacky adhesives capable of adhering two surfaces, there is a pronounced tendency for the nameplate edges to lift off the surface prior to setting of the adhesive. While such lifting off can be prevented in some instances by binding down the nameplates with tape, rubber bands or other means until the adhesive sets, such expedients complicate the application of the nameplates to defeat the advantageous features of such aluminum foil nameplates.

Accordingly, an object of the present invention is to provide aluminum foil nameplates which are not subject to the foregoing difficulties and disadvantage.

Another object is to provide an aluminum foil nameplate which is dead soft or nearly so and will not lift off when applied to curved or irregular surfaces before the adhesive can set and yet can withstand such handling to which it must necessarily be subjected during the fabrication thereof.

A further object is to accomplish the foregoing in a simple, practical, reliable and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been discovered that the foregoing objects can be generally accomplished by etching one surface of a sheet of tempered aluminum foil having a color other than that of aluminum which is applied by anodizing and which is adapted to be removed by etching to produce indicia thereon or by etching tempered aluminum and applying paint to produce the indicia; annealing the sheet to remove the temper therefrom, preferably to render the aluminum foil dead soft while holding the sheet to prevent curling or wrinkling thereof; and applying an adhesive-paper laminate to the other surface of the sheet.

In carrying out this process, it has been found that the anodizing which is not removed by etching can withstand the annealing temperatures without degrading the same either structurally or visually or affecting its permanence, and that, after the adhesive is applied to the dead soft or nearly dead soft aluminum foil, the adhesive-paper laminate protects the sheet or individual parts fabricated therefrom against being thereafter defaced or otherwise impaired. The nameplates which are so fabricated can be handled, but once adhesively applied to a curved or irregular surface are so soft that they have no tendency whatsoever to lift off at the edges before the adhesive sets.

As a specific example of practicing the present invention, a black anodized 10 by 14 inch, at least half hard tempered aluminum foil sheet having a nominal thickness of about 0.004 inch was etched by employing a more or less conventional process. This process comprised spraying the surface of one side of the sheet with a light-sensitive photographic type etch resistant, exposing the surface to high intensity light through a multiple type film negative to expose the resistant in the areas where the negative allowed light to pass, softening and washing off the unexposed resistant, immersing the sheet in an etchant whereby only the areas of the sheet from which the resistant has been removed are attached by the etchant, and rinsing the sheet.

Thus, by the proper choice of a negative or a positive film, either the indicia or the background can be etched, to produce a finished nameplate sheet with raised black anodized copy or background and aluminum background or copy, respectively.

The sheet was then annealed for one minute at a temperature of about 675° F., which rendered the aluminum dead soft. While the aluminum foil sheet was so annealed it was held between two frame members adjacent the edges at all four sides which prevented it from being distorted by curling, wrinkling, or developing otherwise unsmoothness on the surface thereof during the annealing step. Preferably, a stack of ten, fifteen or more sheets is held by the frame members to simultaneously anneal a plurality of sheets.

After being annealed an adhesive-paper laminate having a nominal thickness of about .003 inch was adhered onto the side of the sheet opposite the indicia. This laminate stiffened the soft aluminum foil sheet to enable the same to be cut into individual nameplates without damage thereto. Likewise, the laminate protected the nameplates to enable the same to be packaged and again handled before being applied at their point of use.

The adhesive may be of any conventional pressure sensitive heat or solvent type, and sufficient adhesive is used in providing the laminate to leave a coating of adhesive on the nameplate, after removal of the paper, having a nominal thickness of about 0.001 inch.

One hundred nameplates fabricated in the foregoing manner having a length of about 3.5 inches and a width of about 0.875 inch were applied to a curved surface having a radius of about two inches, the adhesive being caused to adhere by the application of solvent and pressure. Each nameplate so applied adhered completely to the surface and had no tendency to lift off at the edges thereof, and was smoothly adhered to the surface when the adhesive had set.

It was further found that the nameplates could be likewise applied to surface of a much smaller radius and adhere properly, that cracks along etched lines, border lines, etc., will not occur, and that the softness of the foil lends itself more readily for stamping serial numbers and other information thereon.

From the foregoing description, it will be seen that the present invention provides an improved aluminum foil nameplate which has many advantages.

As various changes may be made in the form, construction and arrangement of the parts herein, without departing from the spirit and scope of the invention and without sacrificing any of its advantages, it is to be understood that all mattter herein is to be interpreted as illustrative and not in any limiting sense.

I claim:

1. The process of fabricating aluminum foil nameplates which process comprises etching one surface of a sheet of at least half hard aluminum foil having a color other than that of aluminum adapted to be removed by etching to produce indicia thereon and adapted to withstand aluminum annealing temperatures, annealing the aluminum sheet to dead soft while holding the sheet at its edges to prevent distortion of the sheet, and applying an adhesive-paper laminate to the other surface of the sheet.

2. The process according to claim 1, wherein indicia is produced on the sheet to provide a plurality of nameplates, and the sheet is cut into individual nameplates after the laminate has been applied, whereby the laminate prevents damage to the dead soft nameplate during the cutting and further handling thereof.

3. The process of fabricating aluminum foil nameplates which process comprises etching one surface of a sheet of tempered aluminum foil having a color other than that of aluminum adapted to be removed by etching to produce indicia thereon and adapted to withstand aluminum annealing temperatures, arranging a plurality of sheets in a stack, annealing the stack of sheets to remove the temper therefrom while holding the sheets at their edges to prevent distortion of the sheets, separating the sheets from the stack, and applying an adhesive-paper laminate to the other surface of the sheets.

4. The process according to claim 3, wherein indicia is produced on each sheet to provide a plurality of nameplates, and the sheets are cut into individual nameplates after the laminate has been applied, whereby the laminate prevents damage to the dead soft nameplate during the cutting and further handling thereof.

5. The process of fabricating aluminum foil nameplates which process comprises etching one surface of a sheet of tempered aluminum foil, having a color other than that of aluminum adapted to be partially removed by etching to leave portions on the surface to produce indicia thereon which portions are adapted to withstand aluminum annealing temperatures, annealing the sheet to remove the temper therefore while holding the sheet in flat position at its edges to prevent distortion of the sheet, and applying an adhesive-paper laminate to the other surface of the sheet.

6. The process according to claim 5, wherein indicia is produced on the sheet to provide a plurality of nameplates, and the sheet is cut into individual nameplates after the laminate has been applied, whereby the laminate prevents damage to the annealed aluminum foil during the cutting and further handling thereof.

References Cited in the file of this patent

UNITED STATES PATENTS

| 1,128,071 | Stanley | Feb. 9, 1915 |
| 2,506,364 | Jarvie et al. | May 2, 1950 |
| 2,735,763 | Heath | Feb. 21, 1956 |
| 3,006,795 | Brickell | Oct. 31, 1961 |

FOREIGN PATENTS

| 657,428 | Great Britain | Sept. 19, 1951 |
| 727,749 | Great Britain | Apr. 6, 1955 |
| 851,618 | Great Britain | Oct. 19, 1960 |

OTHER REFERENCES

Aluminum Data Book (A.D.B.), Reynolds Metals Co., TA 480A6R49a, 1959, Richmond, Va., 1959, pages 5, 25.